United States Patent [19]

Rankel et al.

[11] Patent Number: 4,500,503
[45] Date of Patent: Feb. 19, 1985

[54] PROCESS FOR THE PREPARATION OF MORDENITE UTILIZING TRANSITION METAL COMPLEXES DURING CRYSTALLIZATION

[75] Inventors: Lillian A. Rankel, Princeton, N.J.; Ernest W. Valyocsik, Yardley, Pa.

[73] Assignee: Mobil Oil Corporation, New York, N.Y.

[21] Appl. No.: 515,718

[22] Filed: Jul. 20, 1983

Related U.S. Application Data

[60] Continuation-in-part of Ser. No. 493,462, May 11, 1983, abandoned, which is a division of Ser. No. 320,285, Nov. 12, 1981, Pat. No. 4,388,285.

[51] Int. Cl.³ ............................................. C01B 33/28
[52] U.S. Cl. .................................... 423/329; 423/328; 501/78
[58] Field of Search ............................... 423/326–333; 501/60, 77, 78

[56] References Cited

U.S. PATENT DOCUMENTS

| 3,373,109 | 3/1968 | Frilette et al. | 423/328 X |
| 3,941,871 | 3/1976 | Dwyer et al. | 423/326 |
| 4,100,262 | 7/1978 | Pelrine | 423/329 |
| 4,388,285 | 6/1983 | Rankel et al. | 423/329 |
| 4,390,457 | 6/1983 | Klotz | 423/328 X |
| 4,397,825 | 8/1983 | Whittam | 423/329 X |

*Primary Examiner*—Edward J. Meros
*Attorney, Agent, or Firm*—A. J. McKillop; M. G. Gilman; J. F. Powers, Jr.

[57] ABSTRACT

A series of transition metal complexes, having stability at relatively high pH, have been utilized as templates for the synthesis of mordenite type zeolites.

5 Claims, No Drawings

PROCESS FOR THE PREPARATION OF MORDENITE UTILIZING TRANSITION METAL COMPLEXES DURING CRYSTALLIZATION

CROSS REFERENCE TO RELATED APPLICATIONS

This application is a continuation-in-part of application Ser. No. 493,462, filed May 11, 1983, now abandoned, which, in turn, is a divisional of application Ser. No. 320,285, filed Nov. 12, 1981, now U.S. Pat. No. 4,388,285, the disclosures of which are incorporated herein by reference.

BACKGROUND OF THE INVENTION

The present invention relates to a novel process for the preparation of mordenite zeolites utilizing certain transition metal complexes as templates for the synthesis of said zeolite materials.

DESCRIPTION OF THE PRIOR ART

Mordenite is a well known crystalline zeolite disclosed in the patent and technical literature. It has often been desirable in the prior art to include a metal complex, including transition metal complexes in the conventional forming solution for the preparation of mordenite. In this connection, typical prior art patents, such as U.S. Pat. Nos. 3,530,064 and 3,373,109; as well as British Pat. No. 1,264,545 generally teach the incorporation of metals into zeolites including mordenite. However, in all the above-mentioned procedures, the metal was not used as a template but was merely, at most, added to the conventional crystallization mix which contained the necessary ingredients for crystallizing mordenite. In other words, in the prior art techniques for the formation of zeolites wherein metals were introduced into the forming solution, the forming solution *itself* would have produced the same zeolite irrespective of the presence or absence of the metal. Thus, it is clear that the metal was not essential for the crystallization of the zeolite.

In summary, the instant invention differs from all the above because transition metal compounds are used which are necessary for crystallization. Thus, in the instant invention the transition metal compounds are necessary for crystallization at the high silica-to-alumina conditions used for synthesis and without the transition metal present, no crystalline mordenite would be obtained.

DESCRIPTION OF THE PREFERRED EMBODIMENTS

The novel process of this invention is carried out by mixing a suitable source of silica, a source of alumina, a source of alkali metal, and at least one transition metal complex which will be hereinafter identified and heating the same at elevated temperatures ranging from about 100° to about 250° C. and preferably from about 150° to about 160° C. until crystallization is complete. Crystallization time can vary from about one day to about seven days and it is preferred that the crystallization be carried out while stirring.

The metal complexes which are operable in the novel process of this invention include (1) cobalt phthalocyanines of the formula:

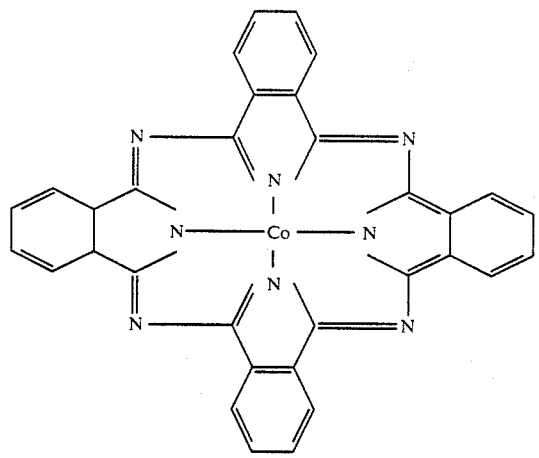

(2) [Pd(Tren)Me$_6$Cl]Cl: Tren(Me$_6$) is tris 2-(dimethylaminoethyl)amine.

(3) Complexes containing a bipyridyl group such as:

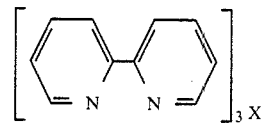

wherein X is NiClO$_4$ or RuCl$_2$ (4) 1-10,phenanthroline(0-phenan)

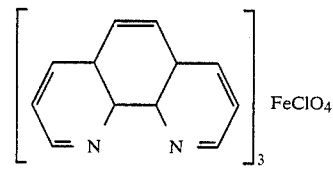

In the novel process of this invention, mordenite is synthesized from forming solutions having more silica than has theretofore been possible. Mordenite can be conveniently prepared by forming a mixture of alumina, silica, alkali metal oxide, water, and the above-described metal complexes such that the mixture has a composition in terms of mole ratios of oxides falling within the following range:

|  | Broad | Preferred |
| --- | --- | --- |
| SiO$_2$/Al$_2$O$_3$ | 40–∞ | 60–90 |
| H$_2$O/SiO$_2$ | 5–200 | 10–100 |
| OH$^-$/SiO$_2$ | 0–3.0 | 0.1–1.0 |
| alkali metal/SiO$_2$ | 0.01–3.0 | 0.1–2.0 |
| M/SiO$_2$ | 0.002–2.0 | 0.1–1.0 | wherein M is moles of complexed metal. The alkali metal can be any member of Group I elements, but is preferably sodium.

The reaction mixture is maintained at a temperature of from about 100° F. to about 500° F. for a period of time of from about 1 hour to about 180 days until crystals of mordenite are formed. A more preferred temperature range is from about 180° F. to about 350° F. for a period of time at a temperature within such preferred range being from about 2 days to about 30 days.

The digestion of the gel particles is carried out until crystals form. The solid product is separated from the reaction medium, as by cooling the whole to room temperature, filtering and water washing.

The composition for the synthesis of mordenite can be prepared utilizing materials which can supply the appropriate oxide. Such materials include aluminates, alumina, silicates, silica hydrosol, silica gel, silicic acid and hydroxides. It will be understood that each oxide component utilized in the reaction mixture for preparing mordenite can be supplied by one or more essential reactants and they can be mixed together in any order. For example, any oxide can be supplied by an aqueous solution, sodium hydroxide or by an aqueous solution of a suitable silicate. The reaction mixture can be prepared either batchwise or continuously.

Even though the presently prepared mordenite can often have a low amount of alkali metal, e.g. sodium, ions, as synthesized, and therefore can be utilized as catalytic material for a number of hydrocarbon conversion reactions substantially as synthesized, the original cations of the as-synthesized mordenite can be replaced in accordance with techniques well known in the art, at least in part, by ion exchange with other cations. Preferred replacing cations include metal ions, ammonium ions, hydrogen ions and mixtures thereof. Particularly preferred cations are those which render the zeolite catalytically active especially for hydrocarbon conversion. These include hydrogen, rare earth metals, aluminum, metals of Groups IIA, IIIB, IVB, VIB, VIII, IB IIB, IIIA, IVA. Of the replacing metallic cations, particular preference is given to cations of metals such as rare earth, Mn, Ca, Mg, Zn, Cd, Pd, Ni, Co, Ti, Al, Sn, Fe and Co.

A typical ion exchange technique would be to contact the synthetic mordenite zeolite after calcination with a solution of a salt of the desired replacing cation or cations. Although a wide variety of salts can be employed, particular preference is given to chlorides, nitrates and sulfates.

Representative ion exchange techniques are disclosed in a wide variety of patents, including U.S. Pat. Nos. 3,140,249; 3,140,251 and 3,140,253.

Following contact with the salt solution of the desired replacing cation, the zeolite is then preferably washed with water and dried at a temperature ranging from 150° F. to about 600° F. and thereafter may be calcined in air or other inert gas at temperatures ranging from about 500° F. to 1500° F. for periods of time ranging from 1 to 48 hours or more to produce a catalytically-active thermal decomposition product thereof.

The hereby prepared zeolite mordenite may be used in the conversion of a wide variety of organic compounds, e.g. hydrocarbon compounds. Such processes include, for example, isomerization disproportionation, oligomerization of olefins and cracking and hydrocracking—all of which are well known in the art. All of the foregoing catalytic processes are of value since they result in upgrading of the organic charge being processed.

Synthetic mordenite zeolites prepared in accordance hereto can be used either in the alkali metal form or hydrogen form or another univalent or multivalent cationic form. They can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to mordenite such as, for example, by, in the case of platinum, treating the zeolite with a platinum metal-containing ion. Thus, suitable platinum compounds for this purpose include chloroplatinic acid, platinous chloride and various compounds containing the platinum amine complex. Combinations of metals and methods for their introduction can also be used.

In the case of many catalysts, it is desired to incorporate the mordenite hereby prepared with another material resistant to the temperatures and other conditions employed in organic conversion processes. Such matrix materials include active and inactive materials and synthetic or naturally occurring zeolites as well as inorganic materials such as clays, silica and/or metal oxides. The latter may be either naturally occurring or in the form of gelatinous precipitates, sols or gels including mixtures of silica and metal oxides. Use of a material in conjunction with the ZSM-5, i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Frequently, zeolite materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized mordenite catalyst include the montmorillonite and kaoline family, which families include the sub-bentonites, and the kaolines commonly known as Dixie, McNamee, Georgia and Florida clays or others in which the main mineral constituent is halloysite, kaolinite, dickite, nacrite, or anuaxite. Such clays can be used in the raw state or initially subjected to calcination, acid treatment or chemical modification.

In addition to the foregoing materials, the mordenite catalyst hereby synthesized can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline aluminosilicate mordenite and inorganic oxide gel matrix vary widely with the crystalline aluminosilicate content ranging from about 1 to about 90 percent by weight and more usually in the range of about 10 to about 70 percent by weight of the composite.

The following examples will illustrate the novel process of this invention.

EXAMPLES 1-8

In all the examples which follow crystallizations were carried out with Q-brand sodium silicate (27.8% $SiO_2$: 8.4% $Na_2O$; 63.8% $H_2O$) and $Al_2(SO_4)_2 \cdot 16H_2O$ at 160° C. while stirring at autogenous pressure. In all the Examples which follow the H₂O/SiO₂ molar ratio was 40 and the Na⁻/SiO₂ molar ratio was 0.6. Additional reaction compositions and the results obtained are shown in the following table 1.

Note in Examples 7 and 8, that at the same compositions, when no template is added to the reaction mixtures, no crystallization takes place in the hydrogel at comparable reaction times.

TABLE 1

Crystallizations of Mordenite with Metal Complexes
Q-Brand; Al₂(SO₄)₃.16 H₂O; 160° C., stirred

| Example | Mixture Mole Ratios | | | Compound, M | Run Time, Days | Product |
|---|---|---|---|---|---|---|
| | SiO₂/Al₂O₃ | OH/SiO₂ | M/SiO₂ | | | |
| 1 | 90 | 0.60 | 0.05 | (C₈H₄N₂)₄Co$^a$ | 4 | 15% mordenite + unident. component |
| 2 | 90 | 0.40 | 0.10 | Ru(bipyr)₃Cl₂$^b$ | 3 | 40% mordenite + trace component |
| 3 | 90 | 0.40 | 0.10 | [Pd(tren)Me₆Cl]Cl$^c$ | 2 | 10% mordenite |
| 4 | 90 | 0.40 | 0.10 | (o-phenan)₃FeClO₄$^d$ | 5 | 10% mordenite |
| 5 | 90 | 0.40 | 0.10 | Ni(bipyr)₃ClO₄ | 2 | 10% mordenite |
| 6 | 60 | 0.40 | 0.10 | ↓ | 3 | 15% mordenite |
| 7 | 60 | 0.40 | 0 | None | 3 | Amorphous |
| 8 | 90 | 0.40 | 0 | None | 3 | Amorphous |

$^a$ (C₈H₄N₂)₄ = PC = phthalocyanine
$^b$ bipyr = bipyridyl
$^c$ (Tren)Me₆ = tris 2-(dimethylaminoethyl) amine = N(CH₂CH₂N(CH₃)₂)₃
$^d$ o-phen = o-phenanthroline or 1.10-phenanthroline

What is claimed is:

1. In the process for the synthesis of mordenite from a forming solution containing a mixture of alumina, silica, alkali metal oxide and water, the improvement which comprises adding a metal complex selected from the group consisting of cobalt phthalocyanine; (o-phenanthroline)₃FeClO₄; Ru(bipyridyl)₃Cl₂ and Ni(bipyridyl)₃ClO₄ to the reaction mixture and maintaining the same at a temperature of from 100° F. to about 400° F. until crystals of mordenite are formed with the proviso that when cobalt phthalocyanine is used the OH⁻/SiO₂ ratio of the forming solution is 0.6.

2. The process of claim 1 wherein the metal complex is cobalt phthalocyanine.

3. The process of claim 1 wherein the metal complex is (o-phenanthroline)₃FeClO₄.

4. The process of claim 1 wherein the metal complex is Ru(bipyridyl)₃Cl₂.

5. The process of claim 1 wherein the metal complex is Ni(bipyridyl)₃ClO₄.

* * * * *